United States Patent
Chauhan

(10) Patent No.: US 11,563,859 B2
(45) Date of Patent: Jan. 24, 2023

(54) INTERNET SUBSCRIPTION MANAGEMENT IN A CELLULAR-BASED NETWORK

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

(21) Appl. No.: 17/191,167

(22) Filed: Mar. 3, 2021

(65) Prior Publication Data
US 2022/0286565 A1 Sep. 8, 2022

(51) Int. Cl.
*H04M 15/00* (2006.01)
*H04W 4/24* (2018.01)

(52) U.S. Cl.
CPC ......... *H04M 15/721* (2013.01); *H04M 15/58* (2013.01); *H04M 15/745* (2013.01); *H04W 4/24* (2013.01)

(58) Field of Classification Search
CPC .. H04M 15/721; H04M 15/58; H04M 15/745; H04W 4/24
See application file for complete search history.

(56) References Cited

U.S. PATENT DOCUMENTS

| | | | |
|---|---|---|---|
| 9,215,159 B2 * | 12/2015 | Raleigh | H04L 47/19 |
| 9,240,950 B2 | 1/2016 | Vedula et al. | |
| 10,178,035 B2 * | 1/2019 | Dillon | H04L 43/0888 |
| 2005/0191989 A1 * | 9/2005 | Plush | H04M 15/8083 |
| | | | 455/406 |
| 2015/0201333 A1 * | 7/2015 | Raleigh | G06Q 10/06375 |
| | | | 455/411 |

* cited by examiner

*Primary Examiner* — Pakee Fang
(74) *Attorney, Agent, or Firm* — Han Santos, PLLC

(57) ABSTRACT

This disclosure is directed to techniques for directly managing, via a cellular modem device, an in-home Internet service subscription plan for using an in-home Internet service from a wireless carrier network. The cellular modem device may facilitate adjustment of the in-home Internet subscription plan by monitoring Internet service usage at the cellular modem device and then comparing a monitored Internet service usage with a corresponding threshold value. Based on this comparison, the cellular modem device may present to the subscriber a selection that correspond to different adjustments in the subscription plan. The cellular modem device may then send a request for adjustment to Internet service provider based on a user-entered selection and a notification is thereafter received by the cellular modem device for the adjustment of the subscription plan by the Internet service provider.

19 Claims, 9 Drawing Sheets

INTERNET SUBSCRIPTION MANAGEMENT IN A CELLULAR-BASED NETWORK

BACKGROUND

Internet access over a wireless telecommunications network is becoming prevalent due to advances in wireless technologies and user convenience of accessing high-speed Internet from portable devices such as a cellphone, laptop, and/or the like. While the accessibility of Internet access over the wireless telecommunications network is continuously improving, most subscribers generally select subscription plans based on the prices of the subscription plans. The subscribers may change to a different subscription plan after a particular period depending upon their average consumption and financial needs. Accordingly, the subscribers oftentimes may access their respective accounts and check for possible improvements or optimizations in their current subscription plan.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
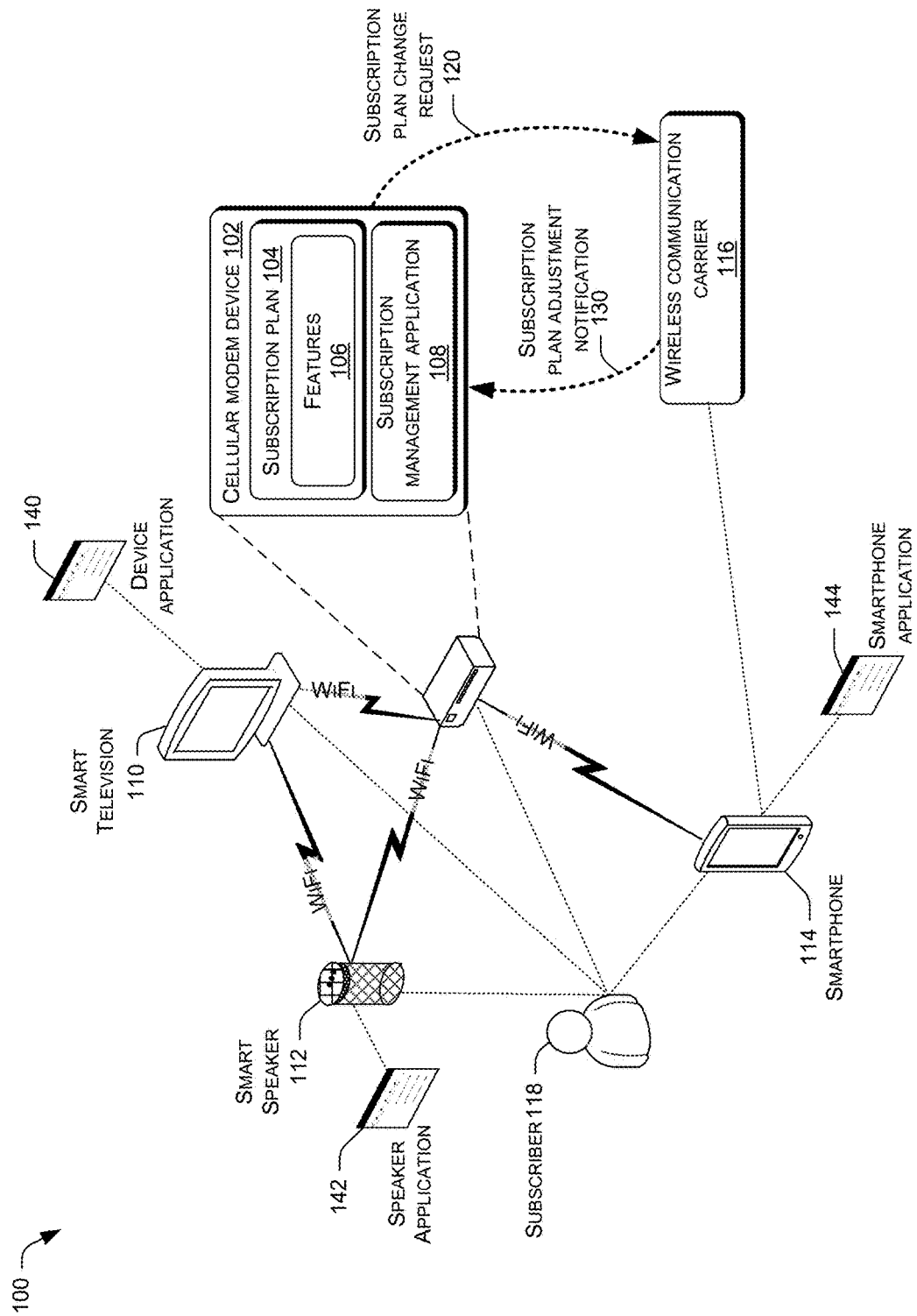
FIG. 1 illustrates an example architecture that uses a cellular modem device to manage an in-home Internet service subscription plan for using an in-home Internet service from a wireless carrier network.

This disclosure is directed to techniques for managing, via a cellular modem device, an in-home Internet service subscription plan for using an in-home Internet service from a wireless carrier network. The cellular modem device is an electronic communication device that may connect a router and/or other user devices to an Internet service provider over the wireless carrier network. The user devices may include electronic communication devices such as a smartphone, smart television, a smart speaker, a laptop, a personal digital assistant (PDA), a multimedia device, a tablet, or any other similar functioning device. The wireless carrier network may be operated by a wireless communication carrier that provides Internet access. When providing Internet access, the wireless communication carrier can be referred to as an Internet service provider.

In one example, the cellular modem device may facilitate adjustments in the in-home Internet service subscription plan (referred to hereinafter as subscription plan) by monitoring an Internet service usage at the cellular modem device and then comparing a monitored Internet service usage with a corresponding threshold (value). Based on this comparison, the cellular modem device may present, via its user interface, subscription plan change options to a subscriber. Each of the subscription plan change options may correspond to a request for an adjustment in one or more features associated with the subscription plan. The subscriber may then enter a selected subscription plan change option on the user interface, and the cellular modem device sends a subscription plan change request to the Internet service provider. In response to a received subscription plan change request from the cellular modem device, the Internet service provider may adjust the subscription plan and send a notification of the adjustment of the subscription plan to the cellular modem device. Alternatively, the cellular modem device may use a connected user device for presenting the subscription plan change options, receiving user-entered selections, and/or displaying the notifications of the adjustment of the subscription plan. This technique of managing the subscription plan via the cellular modem device may improve user experience and increase business revenues of the Internet service provider, which typically supplies the cellular modem devices to the subscribers.

In one embodiment, one or more features that may be associated with the subscription plan include a current download speed limit, a current upload speed limit, a download data cap for a billing period, or an upload data cap for a billing period. The billing period may include a billing cycle for a purchased subscription, which can be a monthly subscription, an annual subscription, or some other periodic subscription. In this embodiment, the subscription plan change request for the adjustment in the one or more features may correspond to upgrading to a higher download or upload speed limit, downgrading to a lower download or upload speed limit, purchasing an additional data download amount for the current billing period, or purchasing an additional data upload amount for the current billing period. Further example implementations are provided below with reference to the following figures.

Example Architecture

FIG. 1 is a diagram of an example architecture 100 that uses a cellular modem device to manage a subscription plan for using an in-home Internet service from a wireless carrier network. The architecture 100 illustrates, for example, a cellular modem device 102 that may include a subscription plan 104, one or more features 106, and a subscription management application 108. The cellular modem device 102 may connect user devices such as a smart television 110, a smart speaker 112, and a smartphone 114 to a wireless communication carrier 116. The wireless communication carrier 116 may provide Internet access and can be referred to as an Internet service provider. In one embodiment, the cellular modem device 102 may be used to adjust the one or more features 106 associated with the subscription plan 104 that is purchased by a subscriber 118. Instead of using a laptop, a cellphone, and/or similar devices to access an Internet service provider's website to adjust the one or more features associated with the purchased subscription plan, the use of the cellular modem device 102 may improve user experience and further enhances the business of the wireless communication carrier 116 as the Internet service provider. The features 106 may include parameters or settings associated with the subscription plan 104. On the other hand, the subscription plan 104 may include an in-home Internet service that is purchased by the subscriber 118 from the wireless communication carrier 116.

The wireless communication carrier 116 may include a platform that provides Internet access to organizations or individuals such as the subscriber 118. The wireless communication carrier 116 may operate a wireless carrier network that can provide the Internet access and a wide range of mobile communication services, as well as ancillary services and features, to subscribers and associated mobile device users. This wireless carrier network may be implemented using multiple interconnected networks. In one example, the wireless carrier network may include multiple Radio Access Networks (RANs) that may be connected via regional ground networks. In turn, the regional ground networks may be connected to a core network by a wide area network (WAN). The wireless carrier network may provide telecommunication and data communication in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), CDMA-2000 (Code Division Multiple Access 2000), 5G, and/or so forth. In some instances, the wireless communication carrier 116 can be referred to as Internet service provider. In other cases, the wireless communication carrier 116 may be an Internet service server that is operated by the Internet service provider.

The cellular modem device 102 is communicatively connected to the wireless communication carrier 116 through a radio frequency (RF)-based communication network such as a cellular communication interface. The cellular modem device 102 may also connect with the other user devices such as the smart television 110, smart speaker 112, and smartphone 114 via a direct communication interface such as WiFi™, Bluetooth® Zigbee™, and/or the like. The cellular modem device 102 may use the subscription management application 108 to manage the subscription plan 104 for using the Internet service that is provided by the wireless communication carrier 116.

In various embodiments, the subscription management application 108 is a program installed in the cellular modem device 102 that controls monitoring of the Internet service usage at the cellular modem device 102. By monitoring the Internet service usage, the cellular modem device 102 may obtain and store usage parameter measurements such as a download bandwidth utilization measurement, an upload bandwidth utilization measurement, a current total amount of data downloaded during a current billing period, and/or a current total amount of data uploaded during the current billing period. In some instances, the cellular modem device 102 may send the obtained usage parameter measurements to the wireless communication carrier 116 for storage and/or further processing.

The download bandwidth utilization measurement may include an average download speed that is measured (or monitored) by the cellular modem device 102 within a predetermined time period in a current billing period. The predetermined time period is a portion of the current billing period and can have unit values of days, hours, or other time periods. For example, within a predetermined time period of ten days in a current 30-day billing period, a measured average daily download speed is 50 Mbps. This measured average daily download speed can also be expressed as a percentage of a maximum download speed limit that is associated with the subscription plan 104. For example, the maximum download speed limit for the subscription plan 104 is 100 Mbps. In this example, the measured average daily download speed of 50 Mbps can be expressed as 50% of the 100 Mbps-subscribed maximum download speed. In these examples, the 50 Mbps or 50% average daily download speed is the download bandwidth utilization measurement for the particular Internet service usage.

The upload bandwidth utilization measurement may include an average upload speed limit that is measured by the cellular modem device 102 within the predetermined time period in the current billing period. For example, within a predetermined time period of ten days in a current 30-day billing period, a measured average daily upload speed is 8 Mbps. Similarly, this measured average daily upload speed can be expressed as a percentage of a maximum upload speed limit that is associated with the subscription plan 104. For example, the average upload speed over the ten-day period is 8 Mbps, and the maximum upload speed limit associated with the subscription plan 104 is 10 Mbps. In this example, the average upload speed over the ten-day period can be expressed as 80% of the 10 Mbps-subscribed maximum upload speed. In these examples, the 8 Mbps or 80% average upload speed is the upload bandwidth utilization measurement for the particular Internet service usage.

The current total amount of data downloaded during the current billing period may include the amount of data received by the cellular modem device 102 since a start of a cycle for the current billing period. The current total amount of data uploaded during the current billing period may include the amount of data transferred by the cellular modem device 102 since the start of the cycle for the current billing period.

Following the obtaining of the usage parameter measurements, the subscription management application 108 may compare each of the obtained usage parameter measurements with a corresponding plan parameter threshold. The plan parameter thresholds may be supplied by the Internet service provider and can include a preconfigured limit for each of the usage parameter measurements. The plan parameter thresholds may include a download bandwidth utilization measurement threshold (value), an upload bandwidth utilization measurement threshold (value), a download data cap for a billing period, an upload data cap for a billing period, and/or a time duration threshold (value) for a selected subscription plan change option.

The download bandwidth utilization measurement threshold may include the maximum download speed limit that is associated with the subscription plan 104. The download bandwidth utilization measurement threshold can also include a percentage only of the maximum download speed limit. The percentage of the maximum download speed limit may further include different levels of download speed limit such as an upper download speed limit or a lower download speed limit. The upper download speed limit may include a certain portion of the maximum download speed limit that can be used, for example, as a reference for purchasing a plan that corresponds to upgrading to a higher download speed limit. The lower download speed limit may include a smaller portion of the maximum download speed limit that can be used, for example, as a reference for purchasing a plan that corresponds to downgrading to a lower download speed limit.

For example, the maximum download speed limit for the current subscription plan is 100 Mbps. In this example, the download bandwidth utilization measurement threshold can be the maximum download speed limit of 100 Mbps. Alternatively, the download bandwidth utilization measurement threshold can be a percentage only of the 100 Mbps maximum download speed limit. The use of the percentage can further provide different levels of download speed limit such as 90% of the 100 Mbps for the upper download speed limit or 50% of the 100 Mbps for the lower download speed limit. The upper or lower download speed limit is referred to herein as the upper or lower download bandwidth utilization measurement threshold, respectively. In some instances, the upper download bandwidth utilization measurement threshold can actually include the value of the maximum download speed limit associated with the subscription plan 104. In other cases, different tiers (or percentages) of download bandwidth utilization threshold can be utilized and corresponding different subscription plan change options may be preconfigured for each of the tiers of download bandwidth utilization threshold.

The upload bandwidth utilization measurement threshold may include the maximum upload speed limit that is associated with the subscription plan 104. The upload bandwidth utilization measurement threshold can also be a percentage only of the maximum upload speed limit. The use of the percentage of the maximum upload speed limit may further provide different levels of upload speed limits such as an upper upload speed limit and a lower upload speed limit. The upper upload speed limit may include a particular portion of the maximum upload speed limit that can be used, for example, as a reference for purchasing a plan that corresponds to upgrading to a higher upload speed limit. The lower upload speed limit may include a smaller percentage of the maximum upload speed limit that can be used, for example, as a reference for purchasing a plan that corresponds to downgrading to a lower upload speed limit.

For example, the maximum upload speed limit for the subscription plan is 10 Mbps. In this example, the upload bandwidth utilization measurement threshold can be 10 Mbps or a percentage only of the 10 Mbps-maximum upload speed limit. The percentage can further provide different levels of upload speed limit such as 80% of the 10 Mbps for the upper upload speed limit or 50% of the 10 Mbps for the lower upload speed limit. The upper or lower upload speed limit is referred to herein as the upper or lower upload bandwidth utilization measurement threshold, respectively. In some cases, the upper upload bandwidth utilization measurement threshold can include the maximum upload speed limit associated with the subscription plan. Further, different tiers (or percentages) of upload bandwidth utilization threshold can also be utilized at the cellular modem device 102 and as such, corresponding different subscription plan change options may be preconfigured for each of the tiers of upload bandwidth utilization threshold.

The time duration threshold for the selected subscription plan change option may include a time limit of an adjusted subscription plan. After a lapse of the time duration threshold, the cellular modem device 102 may revert to its previous subscription plan or default subscription plan. For example, the adjustment in the subscription plan includes upgrading to a higher download speed limit with a time limit that ends on the last day of the current billing period. In this example, the subscription plan 104 may revert to a default download speed limit or the previous download speed limit after the lapse of the last day of the current billing period.

In an embodiment, the subscription management application 108 may determine one or more preconfigured subscription plan change options to be presented to the subscriber 118 based on the comparisons between each of the usage parameter measurements and the corresponding plan parameter threshold. The one or more preconfigured subscription plan change options may be supplied by the wireless communications carrier 116. Further, each of the preconfigured subscription plan change options may correspond to an adjustment in one or more features of the subscription plan 104.

In one example, the features 106 that are associated with the subscription plan 104 may include a current download speed limit, a current upload speed limit, a download data cap for a billing period, or an upload data cap for a billing period. Based upon the comparisons between each of the usage parameter measurements and the corresponding plan parameter threshold, the one or more preconfigured subscription plan change options to be presented to the subscriber may correspond to upgrading to a higher download or upload speed limit, downgrading to a lower download or upload speed limit, purchasing an additional data download amount, and/or purchasing an additional data upload amount. These preconfigured subscription plan change options may be presented to the subscriber 118 via a user interface (not shown) of the cellular modem device 102 or through a connected user device such as the smart television 110, smart speaker 112, and/or smartphone 114.

In one embodiment, the subscription management application 108 may present, via the user interface, an interface menu that enables the subscriber 118 to submit a request, such as a subscription plan change request 120, to the wireless communication carrier 116. The subscription plan change request 120 may include information about the subscriber 118, device identification of the cellular modem device 102, the selected subscription plan change option, information about the subscription plan, and/or other information that relates to the adjustment of the subscription plan such as the number of days in the predetermined time period, current usage parameter measurement thresholds, and/or the like. In response to a received subscription plan change request 120, the wireless communication carrier 116 may perform the adjustment in the one or more features of the subscription plan 104 and send a subscription plan adjustment notification 130 to the cellular modem device 102. The subscription plan adjustment notification 130 may indicate the adjustment in the subscription plan 104. In some instances, the wireless communication carrier 116 may also send new plan parameter thresholds that correspond to the adjustments in the subscription plan 104. Upon receipt of the subscription plan adjustment notification 130, the cellular modem device 102 may present the notification to the subscriber 118 via the user interface of the cellular modem device 102 or through the connected user devices.

In one embodiment, the subscription management application 108 may be communicatively connected to a device application 140 of the smart television 110, a speaker application 142 of the smart speaker 112, and/or a smartphone application 144 of the smartphone 114. In this embodiment, the cellular modem device 102 may use the smart television 110, smart speaker 112, and/or smartphone 114 as an input or output interface for managing the subscription plan 104. For example, the cellular modem device 102 may use the connected user device to present the subscription plan change options, notifications, usage parameter measurements, and/or other information that relates to the management of the subscription plan 104. In another example, the cellular modem device 102 may use the connected user device to accept user-entered selection and/or other user-entered input that relates to the management of the subscription plan 104.

The device application 140 may allow the smart television 110 to interact with other devices such as the cellular modem device 102. In one example, the device application 140 may allow the cellular modem device 102 to control and direct the smart television 110 to perform functions that relate to the management of the subscription plan 104 by the cellular modem device. For example, the device application 140 may present, via a screen of the smart television, an interface menu that enables the subscriber 118 to submit a request, such as the subscription plan change request 120, via the cellular modem device 102. The subscriber 118 may view and scroll the interface menu on the screen of the smart television 110 and select, for example, a subscription plan change option. Based upon a user-entered selection on the interface menu, the device application 140 may send the user-entered selection to the cellular modem device 102. In another example, the device application 140 may present an audible interface menu and the subscriber can interact with the smart television 110 via voice inputs. In these examples, the interface menu may present visual and audible notification messages regarding plan usage under the direction of the cellular modem device 102, as well as menus and virtual selection buttons that enable the subscriber to select the presented subscription plan change options. Following a user-entered selection on the interface menu, the device application 140 sends the selection to the cellular modem device 102 for further processing.

The speaker application 142 may allow the smart speaker 112 to respond to voice commands and to establish communications with other devices such as the smart television 110 and the cellular modem device 102. In one example, the speaker application 142 may allow the cellular modem device 102 to control and direct the smart speaker 112 to perform functions that relate to the management of the subscription plan 104 by the cellular modem device. For example, the speaker application 142 may include access to a text-to-speech function to translate the subscription plan change options, notifications, messages, or similar information into a speech so that the subscriber 118 may be able to hear the different subscription plan change options, notifications, messages, and/or similar information. In another example, the speaker application 142 may include access to a voice command function that is able to receive a speech input and use a speech-to-text function to translate the speech input into a corresponding text equivalent input. In these examples, the speaker application 142 may send and/or receive information from the cellular modem device 102 that relates to the management of the subscription plan 104.

The smartphone application 144 may be installed in the smartphone 114 to establish communications with other devices such as the cellular modem device 102, smart television 110, and/or the smart speaker 112. In one example, the smartphone application 144 may allow the cellular modem device 102 to control and direct the smartphone 114 to perform functions that relate to the management of the subscription plan 104 by the cellular modem device. For example, the smartphone application 144 may present an interface menu that enables the subscriber 118 to submit a request, such as the subscription plan change request 120, via the cellular modem device 102. The subscriber 118 may view and scroll the interface menu on a user interface of the smartphone 114 and select, for example, a subscription plan change option. Based upon a user-entered selection on the interface menu, the smartphone application 144 may send the user-entered selection to the cellular modem device 102. In another example, the smartphone application 144 may present audible interface menu and the subscriber can interact with the smartphone via voice inputs. In these examples, the interface menu may present visual and audible notification messages regarding plan usage under the direction of the cellular modem device 102, as well as menus and virtual selection buttons that enable the subscriber to select the presented subscription plan change options. Following a user-entered selection on the interface menu, the smartphone application 144 sends the selection to the cellular modem device 102 for further processing.

Alternatively, the wireless communication carrier 116 as an Internet service server may perform the functionalities of managing the adjustments in the subscription plans. In particular, the Internet service server may receive usage parameter measurements from the cellular modem device 102 and compare the received usage parameter measurements with the corresponding usage parameter thresholds. Based upon this comparison, the Internet service server may display the one or more preconfigured subscription plan change options via the cellular modem device 102 or the user devices (e.g., smart television 110, smart speaker 112, and/or smartphone 114). The Internet service server may then receive the subscription plan change request 120 and adjust accordingly the subscription plan based upon the subscription plan change request. In some cases, the Internet service server may receive first the subscription plan change request 120 before performing the comparison and the sending of the one or more preconfigured subscription plan change options to the cellular modem device 102. Following the adjustment of the subscription plan, the Internet service server may send the subscription plan adjustment notification 130 and the new usage parameter thresholds that correspond to the adjustments in the subscription plan. Further details for managing the subscription plan are described in subsequent figures.

Example Cellular Modem Device Components

Figure 2:
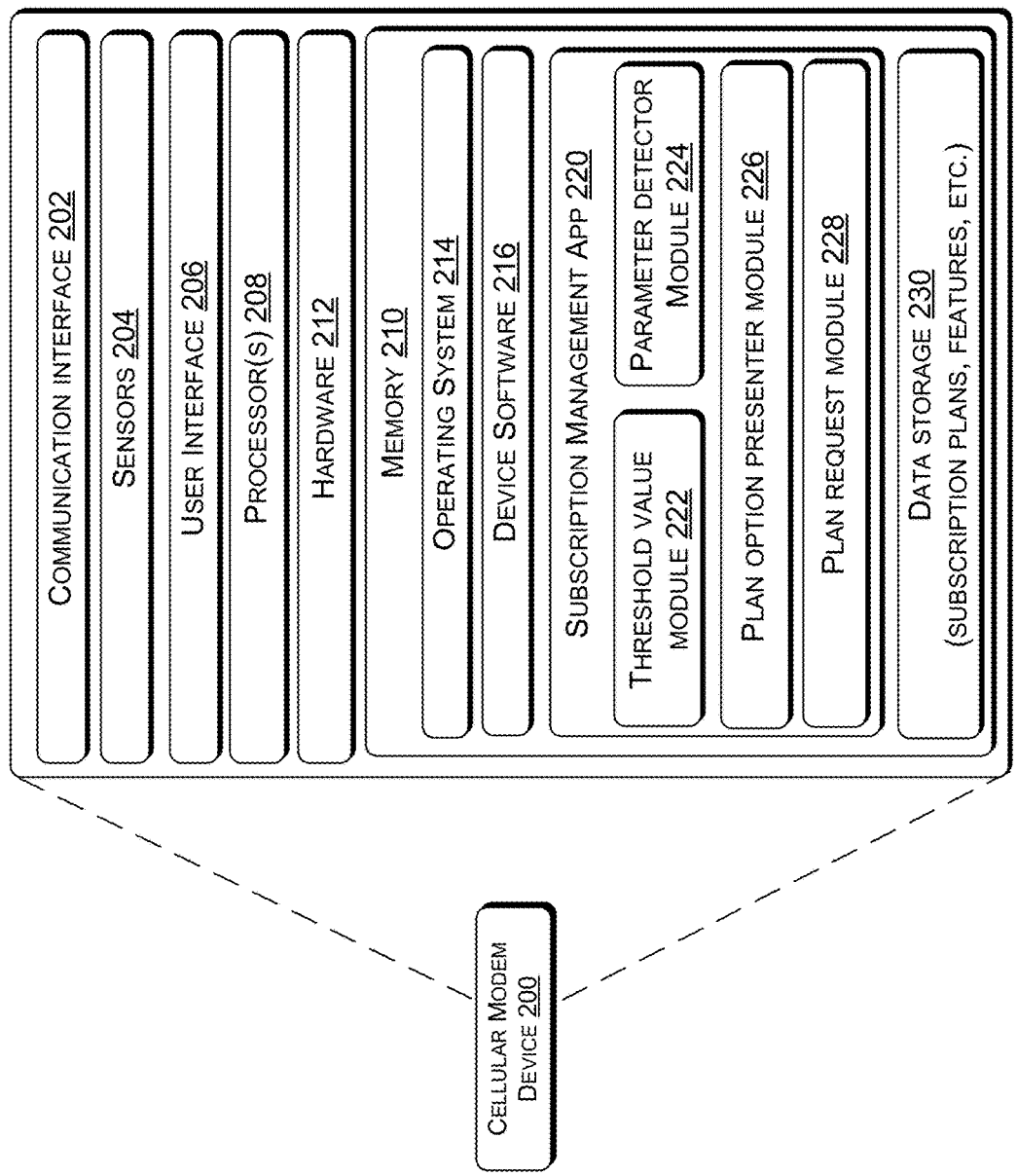
FIG. 2 is a block diagram showing various components of the cellular modem device that are configured to facilitate adjustments in the in-home Internet service subscription plans.

FIG. 2 is a block diagram showing various components of a cellular modem device 200 that is configured to manage the subscription plan purchased by the subscriber from the Internet service provider. The cellular modem device 200 corresponds to the cellular modem device 102 of FIG. 1. The cellular modem device 200 may include a communication interface 202, one or more sensors 204, a user interface 206, one or more processors 208, memory 210, and device hardware 212. The communication interface 202 may include wireless and/or wired communication components that enable the cellular modem device to transmit or receive voice or data communication via the wireless carrier network, as well as other telecommunication and/or data communication networks. The sensors 204 may include a bandwidth measurement sensor, signal strength sensor, latency sensor, cameras, and/or a global positioning system (GPS) sensor, among other appropriate sensors. The bandwidth measurement sensor may perform usage parameter measurements. The signal strength sensor may detect signal power in the cellular communication interface and/or direct communication interface. The latency sensor may detect a quality of connection at the cellular modem device. The cameras may capture images of the environment while the GPS sensor may detect orientation, movement, and geolocation of the cellular modem device 200.

The user interface 206 may enable a subscriber to enter inputs and read outputs from the cellular modem device 200. The user interface 206 may include a data output device (e.g., visual display, audio speakers), and one or more data input devices. The data input devices may include but are not limited to, combinations of one or more keypads, keyboards, mouse devices, touch screens, microphones, speech recognition packages, and any other suitable devices or other electronic/software selection methods. In one example, the user interface 206 may present Internet service usage, details of the subscription plan, the subscription plan change options that may be received from the Internet service provider, and/or other information that relates to the management of the subscription plan by the cellular modem device 200.

The memory 210 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the cellular modem device 200 to perform data communication with the wireless carrier network. The device hardware 212 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the cellular modem device 200 to execute applications and provide data communication functions.

The one or more processors 208 and the memory 210 may implement an operating system 214, device software 216, and a subscription management application 220 that corresponds to the subscription management application 108 of FIG. 1. Such software may include routines, program instructions, objects, and/or data structures that are executed by the processors 208 to perform particular tasks or implement particular abstract data types. The one or more processors 208 in conjunction with the subscription management application 220 may further operate and utilize a threshold value module 222, parameter detector module 224, plan option presenter module 226, plan request module 228, and a data storage 230 to request an adjustment in the subscription plan.

The operating system 214 may include components that enable the cellular modem device 200 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the subscription management application 220. The operating system 214 may include a presentation component that presents the output (e.g., display the data on an electronic display, store the data in memory, transmit the data to another electronic device, etc.).

The operating system 214 may include an interface layer that enables the subscription management application 220 to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include a basic input/output system (BIOS), bootrom, or a bootloader that boots up the cellular modem device 200 and executes the operating system 214 following power-up of the device.

Figure 3:
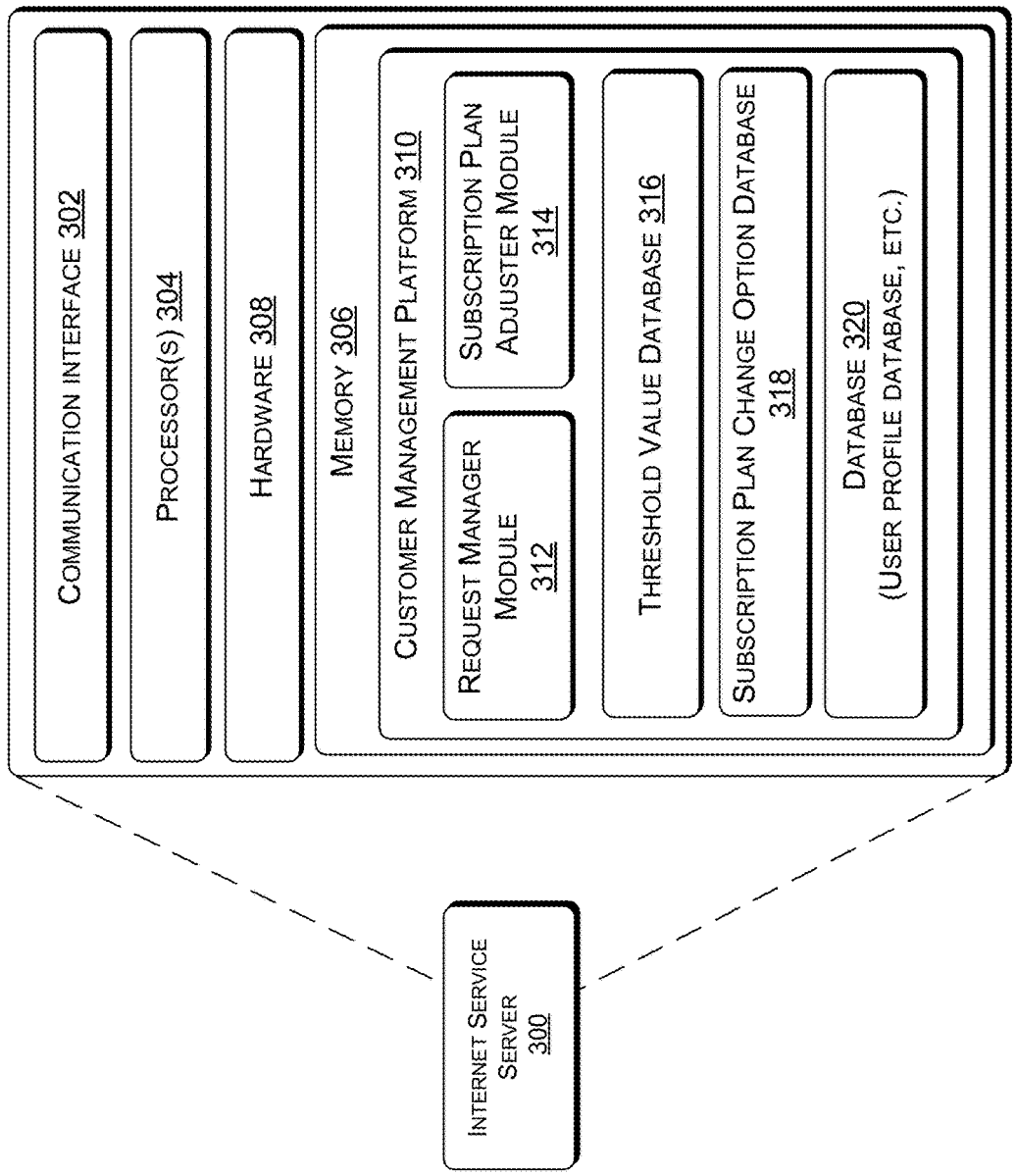
FIG. 3 is a block diagram showing various components of an Internet service server that perform the adjustments in the in-home Internet service subscription plans in response to adjustment requests from the cellular modem device.

The threshold value module 222 may store the plan parameter thresholds that may be received from the Internet service server, such as Internet service server 300 of FIG. 3. For example, the Internet service server may send the plan parameter thresholds for a subscription plan to the subscription management application 220 when the subscriber signs up for an initial subscription plan. In another example, following the adjustment of the subscription plan by the Internet service server, the threshold value module 222 may receive and store new plan parameter thresholds corresponding to the adjustments in the subscription plan. The received plan parameter thresholds may include the download bandwidth utilization measurement threshold, upload bandwidth utilization measurement threshold, download data cap for a billing period, upload data cap for a billing period, and/or the time duration threshold for the selected subscription plan change option.

The download bandwidth utilization measurement threshold may include different levels of download speed limit. In one example, the download bandwidth utilization measurement threshold is preconfigured to include the maximum download speed limit that is associated with the current subscription plan. In another example, the download bandwidth utilization measurement threshold is preconfigured to include a percentage only of the maximum download speed limit. When the percentage of the maximum download speed limit is used, different tiers of download bandwidth utilization measurement thresholds may be provided. For example, the upper download bandwidth utilization measurement threshold may be preconfigured to use 90% of the maximum download speed limit. In another example, the lower download bandwidth utilization measurement threshold may be preconfigured to use 50% of the maximum download speed limit. In these examples, the upper and download bandwidth utilization measurement thresholds may be used as references for different subscription plan change options to be presented to the subscriber. For example, the subscription plan change option may correspond to upgrading to a higher download speed limit when the measured average download speed limit exceeds the upper download bandwidth utilization measurement threshold. Conversely, the subscription plan change option may correspond to downgrading to a lower download speed limit when the measured average download speed limit is lower than the lower download bandwidth utilization measurement threshold.

The upload bandwidth utilization measurement threshold may include different levels of upload speed limit. In one example, the upload bandwidth utilization measurement threshold is preconfigured to include the maximum upload speed limit that is associated with the current subscription plan. In another example, the upload bandwidth utilization measurement threshold is preconfigured to include a percentage only of the maximum upload speed limit. When the percentage of the maximum upload speed limit is used, different tiers of upload bandwidth utilization measurement thresholds may be provided. For example, the upper upload bandwidth utilization measurement threshold may be preconfigured to use 90% of the maximum upload speed limit. In another example, the lower upload bandwidth utilization measurement threshold may be preconfigured to use 50% of the maximum upload speed limit. In these examples, the upper and upload bandwidth utilization measurement thresholds may be used as references for different subscription plan change options to be presented to the subscriber. For example, the subscription plan change option may correspond to upgrading to a higher upload speed limit when the measured average upload speed limit exceeds the upper upload bandwidth utilization measurement threshold. Conversely, the subscription plan change option may correspond to downgrading to a lower upload speed limit when the measured average upload speed limit is lower than the lower upload bandwidth utilization measurement threshold.

The download data cap may include the total amount of data that can be downloaded for the current billing period. The upload data cap may similarly include the total amount of data that can be uploaded during the current billing period. The time duration threshold for the selected subscription plan change option may include the time period associated with the use of the adjustment subscription plan. Upon the lapse of this time period, the cellular device may receive a notification of a reversion back to the previous subscription plan or default subscription plan.

The parameter detector module 224 is configured to obtain usage parameter measurements at the cellular modem device 200. In one example, the parameter detector module 224 may use the sensors 204 to monitor the usage parameter measurements during the current billing period. The usage parameter measurements may include the download bandwidth utilization measurement during the predetermined time period, upload bandwidth utilization measurement during the predetermined time period, the current total amount of data downloaded during the current billing period, or the current total amount of data uploaded during the current billing period. These monitored usage parameter measurements may be stored in the data storage 230. In some embodiments, the monitored usage parameter measurements may be communicated to the Internet service server such as the Internet service server 300 of FIG. 3 for storage or further processing.

The download bandwidth utilization measurement may include the average download speed that is measured at the cellular modem device within the predetermined time period in the current billing period. For example, within a predetermined time period of ten days in a current 30-day billing period, the average daily download speed is 50 Mbps. In this example, the 50 Mbps is the download bandwidth utilization measurement within the predetermined time period. In some instances, the download bandwidth utilization measurement within the predetermined time period can be expressed as the percentage of the maximum download speed limit that is associated with the subscription plan. The percentage-unit value may be used when the corresponding download bandwidth utilization measurement threshold is also utilizing a percentage-unit value. For example, the download bandwidth utilization measurement threshold is 80% of the 100 Mbps maximum download speed limit threshold while the obtained download bandwidth utilization measurement is 50 Mbps, which is 50% of the 100 Mbps maximum download speed limit threshold. In this example, the percentage-unit value of the download bandwidth utilization measurement (50%) may be used for comparison with the percentage-unit value of the download bandwidth utilization measurement threshold (80%).

The upload bandwidth utilization measurement may include the average upload speed that is measured at the cellular modem device within the predetermined time period in the current billing period. For example, within a predetermined time period of ten days in a current 30-day billing period, the average daily upload speed is 10 Mbps. In this example, the 10 Mbps is the upload bandwidth utilization measurement within the predetermined time period. In some instances, the upload bandwidth utilization measurement within the predetermined time period can be expressed as the percentage of the maximum upload speed limit that is associated with the subscription plan. The percentage-unit value may be used when the corresponding upload bandwidth utilization measurement threshold also includes a percentage-unit value. For example, the upload bandwidth utilization measurement threshold is 80% of the 10 Mbps maximum upload speed limit threshold while the obtained upload bandwidth utilization measurement is 5 Mbps, which is 50% of the 10 Mbps maximum upload speed limit threshold. In this example, the percentage-unit value of the upload bandwidth utilization measurement (50%) may be used for comparison with the percentage-unit value of the upload bandwidth utilization measurement threshold (80%).

The plan option presenter module 226 may be configured to compare each of the usage parameter measurements with the corresponding plan parameter threshold. The plan option presenter module 226 may retrieve the usage parameter measurements and the corresponding plan parameter thresholds from the data storage 230 and the threshold value module 222, respectively. The plan option presenter module 226 may be further configured to present, via the user interface 206, the preconfigured one or more subscription plan change options based upon the comparison between each of the usage parameter measurements and the corresponding plan parameter threshold. The subscription plan change options may be received from the Internet service server and stored in the data storage 230, or cellular modem device 200 may be access them from a database in the Internet service server.

For example, the plan option presenter module 226 may retrieve and present one or more subscription plan change options from the data storage 230 for upgrading to a first new subscription plan with a higher download speed limit when the comparison indicates that the download bandwidth utilization measurement during the predetermined time period exceeded the upper download bandwidth utilization measurement threshold. In another example, the plan option presenter module 226 may present one or more subscription plan change options for upgrading to a second new subscription plan with a higher upload speed limit when the comparison indicates that the upload bandwidth utilization measurement during the predetermined time period exceeded the upper upload bandwidth utilization measurement threshold.

In one example, the plan option presenter module 226 may access and present one or more subscription plan change options from the database of the Internet service server for downgrading to a new subscription plan with a lower download speed limit when the comparison indicates that the download bandwidth utilization measurement during the predetermined time period is lower than the lower download bandwidth utilization measurement threshold. Alternatively, the plan option presenter module 226 may present one or more subscription plan change options for downgrading a new subscription plan with a lower upload speed limit when the comparison indicates that the upload bandwidth utilization measurement during the predetermined time period is lower than the lower upload bandwidth utilization measurement threshold.

In another example, the plan option presenter module 226 may present one or more subscription plan change options to purchase an additional data download amount when the comparison indicates that an average daily data download amount exceeds an available daily data download amount during the current billing period. In this example, the average daily data download amount is the current total amount of data downloaded during the current billing period divided by the number of days elapsed in the current billing period while the available daily data download amount is the download data cap for the current billing period divided by a total number of days in the current billing period. Further, the plan option presenter module 226 may present one or more subscription plan change options to purchase a subscription plan that includes a higher download data cap for a next billing period when the comparison indicates that the average daily data download amount exceeds the available daily data download amount during the current billing period.

In some embodiments, the plan option presenter module 226 may present one or more subscription plan change options to purchase an additional data upload amount when the comparison indicates that an average daily data upload amount exceeds an available daily data upload amount during the current billing period. The average daily data upload amount is the current total amount of data uploaded during the current billing period divided by the number of days elapsed in the current billing period, and the available daily data upload amount is the upload data cap for the current billing period divided by a total number of days in the current billing period. Further, the plan option presenter module 226 may present one or more subscription plan change options to purchase a subscription plan that includes a higher upload data cap for the next billing period when the comparison indicates that the average daily data upload amount exceeds the available daily data upload amount during the current billing period.

Following the presentation of the one or more subscription plan change options to the subscriber via the user interface 206 or via the connected user devices, the processor 208 may receive a selected preconfigured subscription plan change option from the subscriber. The processor 208 may forward this selection to the subscription management application 220, which in turn, sends this information to the plan request module 228.

The plan request module 228 may be configured to send the subscription plan change request (e.g., subscription plan change request 120 of FIG. 1) to the Internet service server based on the selected preconfigured subscription plan change option. In one example, the subscription plan change request may include the device identification of the cellular modem device 200, the selected subscription plan change option, and/or other information that relates to the selection of the subscription plan change option. For example, the other information may relate to the device information of the user smartphone that may directly receive notification of adjustment in the subscription plan from the Internet service server (or Internet service provider). Following the sending of the subscription plan change request, the cellular modem device through the communication interface 202 may receive the notification for the adjustment in the subscription plan by the Internet service server.

The data storage 230 may store the obtained usage parameter measurements, subscription plan and associated features, and the one or more subscription plan change options that can be received from the Internet service server. In one example, the usage parameter measurements are updated every time that the parameter detector module 224 is performing usage parameter measurements on the Internet service. The data storage 230 may similarly store other data that may be taken via the sensors 204. The other data may include signal strength, network latency, and/or geolocation of the cellular modem device 200. In another example, the data storage 230 may store the device identification of the connected user devices such as the smart speaker, smart television, and smartphone.

Accordingly, the one or more processors 208 in conjunction with the subscription management application 220 may use the threshold value module 222, parameter detector module 224, plan option presenter module 226, plan request module 228, and the data storage 230 to manage the subscriber plan of the subscriber as described herein.

Example Internet Service Provider Server Components

FIG. 3 is a block diagram showing various components of an Internet service server 300 that may adjust the subscriber's subscription plan based upon the subscription plan change request received from the cellular modem device. In one example, the Internet service server 300 may initiate and perform an overall process of managing the subscription plan and utilizes the cellular modem and/or the connected user device for presentation and/or to communicate information to the subscriber. The information may relate to the management of the subscription plan. The Internet service server 300 may include a communication interface 302, one or more processors 304, memory 306, and device hardware 308. The communication interface 302 may include wireless and/or wired communication components that enable the Internet service server 300 to transmit data to and receive data from the cellular modem device and/or other devices. The Internet service server 300 may be accessed via the device hardware 308. The device hardware 308 may include an additional user interface, data communication, or data storage hardware. For example, the user interface may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 304 may implement a customer management platform 310 to adjust the subscription plans for the Internet services based on received subscription plan change requests, such as the subscription plan change request 120 of FIG. 1, from the cellular modem device. In one embodiment, the customer management platform 310 may include a request manager module 312 and a subscription plan adjuster module 314. The modules may include routines, program instructions, objects, and/or data structures that perform particular tasks or implement particular abstract data types. Further, the customer management platform 310 may access a threshold value database 316, a subscription plan change option database 318, and a database 320 in adjusting the subscription plans for the Internet service. In one embodiment, the customer management platform 310 may adjust the subscription plans for the Internet services based on the received subscription plan change requests from the cellular modem devices. Alternatively, the customer management platform 310 may initiate and perform the adjustments on its own by using the cellular modem devices as instruments for displaying information and/or other communication that relates to the management of the subscription plans.

The request manager module 312 may process the subscription plan change request that can be received from the cellular modem device. One functionality of the request manager module 312 is to verify the source of the subscription plan change request. For example, the request manager module 312 may use the device identification of the sending cellular modem device to verify whether the device identification is associated with the subscription plan to be adjusted. In this example, the request manager module 312 may utilize the database 320 in verifying the device identification and other information in the received subscription plan change request. Another functionality of the request manager module 312 is to queue the received subscription plan change requests according to the time that they were received.

Alternatively, in a case where the Internet service server 300 is managing the subscription plan, the customer management platform 310 may control the communicating of the subscription plan change requests from the cellular modem devices. In one example, the customer management platform 310 may request a particular cellular modem device to communicate the subscription plan change request that is received from the subscriber. In another example, the customer management platform 310 may use a subscriber profile to identify the possible plan change request that may be selected by the subscriber. The subscriber profile may include the preferences entered by the subscriber in a user profile upon purchase of a subscription plan from the Internet service provider.

The subscription plan adjuster module 314 may be configured to adjust the one or more features of the subscription plan based upon the verified subscription plan change request from the request manager module 312. The adjustments in the one or more features may include upgrading to the higher download speed limit, increasing the amount of data to be downloaded, and so on. Following the adjustments in the subscription plan, the subscription plan adjuster module 314 may retrieve new plan parameter thresholds from the threshold value database 316 and associate these new plan parameter thresholds to the adjusted subscription plan. Another functionality of the subscription plan adjuster module 314 is to supply one or more preconfigured subscription plan change options to the cellular modem device. For example, the subscription plan adjuster module 314 may retrieve the preconfigured subscription plan change options from the subscription plan change option database 318 and send the preconfigured subscription plan change options to the cellular modem device.

The threshold value database 316 may store the plan parameter thresholds for each of the usage parameter measurements in the cellular modem device. In an embodiment, the stored plan parameter thresholds may be supplied to the cellular modem device to be used for comparisons with the obtained usage parameter measurements. Alternatively, in a case where the Internet service server 300 is managing the subscription plan, the subscription plan adjuster module 314 may utilize the plan parameter thresholds that are retrieved from the threshold value database 316 for comparison with stored usage parameter measurements in the database 320. In this regard, the comparison is performed in the Internet service server 300. The plan parameter thresholds may include the upper and lower download bandwidth utilization measurement thresholds, upper and lower upload bandwidth utilization measurement thresholds, the download data cap for a billing period, and/or the upload data cap for the billing period.

The download bandwidth utilization measurement threshold may include different levels of download speed limit. In one example, the processor 304 in conjunction with the customer management platform 310 may preconfigure different tiers of the download bandwidth utilization measurement thresholds. Further, the processor 304 may preconfigure different subscription plan change options that correspond to these different tiers of download bandwidth utilization measurement thresholds. For example, two levels (90% and 70%) of upper download bandwidth utilization measurement thresholds, instead of one, are used as references for the upgrading of the download speed limit. When the average download speed over a predetermined time period, for example, exceeds a first upper download bandwidth utilization measurement threshold of 90%, then the corresponding subscription plan change option may include upgrading to a first download speed limit. However, when the average download speed over the predetermined time period, for example, exceeds a second upper download bandwidth utilization measurement threshold of 70%, then the corresponding subscription plan change option may include upgrading to a second download speed limit.

The upload bandwidth utilization measurement threshold may also include different levels of upload speed limit. In one example, the processor 304 in conjunction with the customer management platform 310 may similarly preconfigure different tiers of the upload bandwidth utilization measurement thresholds. Further, the processor 304 may preconfigure different subscription plan change options that correspond to these different tiers of upload bandwidth utilization measurement thresholds.

The subscription plan change option database 318 may store the preconfigured subscription plan change options for different subscription plans. In one example, the customer management platform 310 may send to the cellular modem device the preconfigured subscription plan change options for each of the subscription plans. Alternatively, in a case where the Internet service server is performing the management of the subscription plans, customer management platform 310 may access the subscription plan change options from the subscription plan change option database 318.

The database 320 may store the received usage parameter measurements from the cellular modem device, details of the subscription plans, user profile of the subscribers, and other data that relate to the adjustments of the subscription plans. For example, database 320 may store user profile information for each one of the subscribers, the device identifications of the connected user devices, the geolocations of the requesting cellular modem devices, and so on.

Accordingly, the Internet service server 300 may perform the adjustments in the subscription plan based upon the subscription plan change request from the cellular modem device. Alternatively, the Internet service server 300 may initiate and perform the overall process of managing the subscriptions plans by using the cellular device and/or user device as input and/or output devices for presentation and/or to communicate information to the subscriber.

Example User Interface

Figure 4:
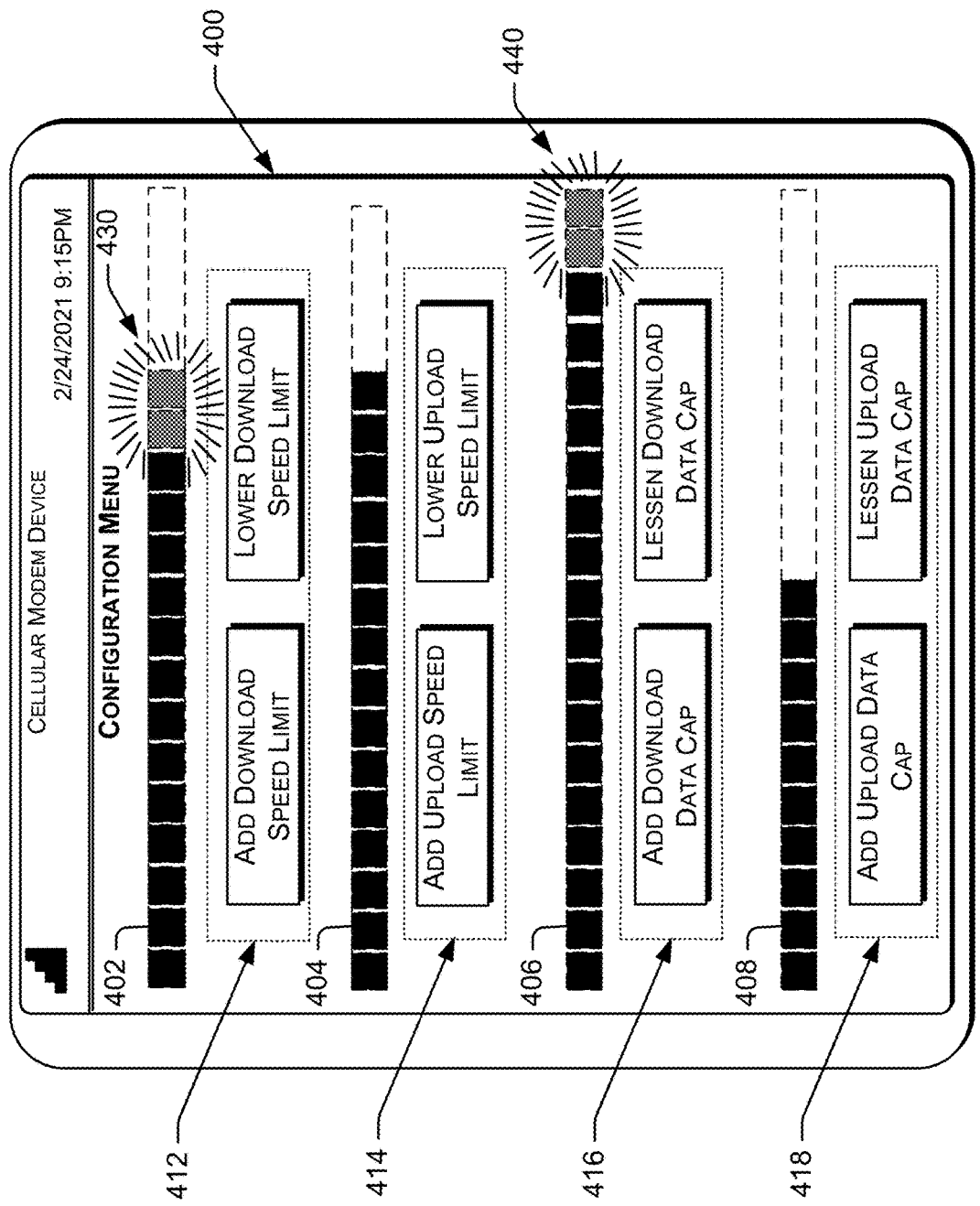
FIG. 4 shows an example configuration interface displayed on the cellular modem device for configuring the cellular modem device to request adjustments in the in-home Internet service subscription plans.

FIG. 4 shows an example configuration interface 400 displayed on the cellular modem device for configuring the cellular modem device to request adjustments in the subscription plans. In some embodiments, the configuration interface 400 may be a touch display screen that is configured to display information and virtual selection options. In such embodiments, the configuration interface 400 may present a download speed limit indicator light bar 402 that represents a download bandwidth utilization measurement within a predetermined time period, an upload speed limit indicator light bar 404 that represents an upload bandwidth utilization measurement within the predetermined time period, a data download cap indicator light bar 406 that represents an amount of data downloaded for a current billing period, and a data upload cap indicator light bar 408 that represents an amount of data uploaded for the current billing period. The configuration interface 400 further shows button selection options 412, 414, 416, and 418 for the indicator light bars 402, 404, 406, and 408, respectively.

In one example, the download speed limit indicator light bar 402 may show flashing lights 430 to indicate that the download bandwidth utilization measurement within the predetermined time period has exceeded the corresponding plan parameter threshold. In this example, the subscriber may use the button selection option 412 to request an adjustment in the subscription plan. The adjustment may correspond to upgrading or downgrading of the download speed limit. In another example, the data download cap indicator light bar 406 may show blinking lights 440 to indicate that the amount of data downloaded for the current billing period has exceeded the data download cap. In this example, the subscriber may use the button selection option 416 to request an adjustment in the subscription plan that can correspond to purchasing of additional download data cap for the current billing period.

Alternatively, the configuration interface 400 may include screen buttons (not shown) for reviewing of the subscription plan, viewing subscription plan change options, and/or presenting options of connecting to the user devices such as the smart television, smart speaker, and/or the smartphone. In other embodiments, the configuration interface 400 may be replaced with a hardware interface that is equipped with physical lights and/or physical buttons. In such embodiments, the physical lights and/or the physical buttons may perform identical or similar functions as those virtual lights and buttons displayed by the touch display screen version of the configuration interface 400.

Example Processes

FIGS. 5-9 present illustrative processes 500-900 for using the cellular modem device to adjust the subscription plan. Each of the processes 500-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-900 are described with reference to the architecture 100 of FIG. 1.

Figure 5:
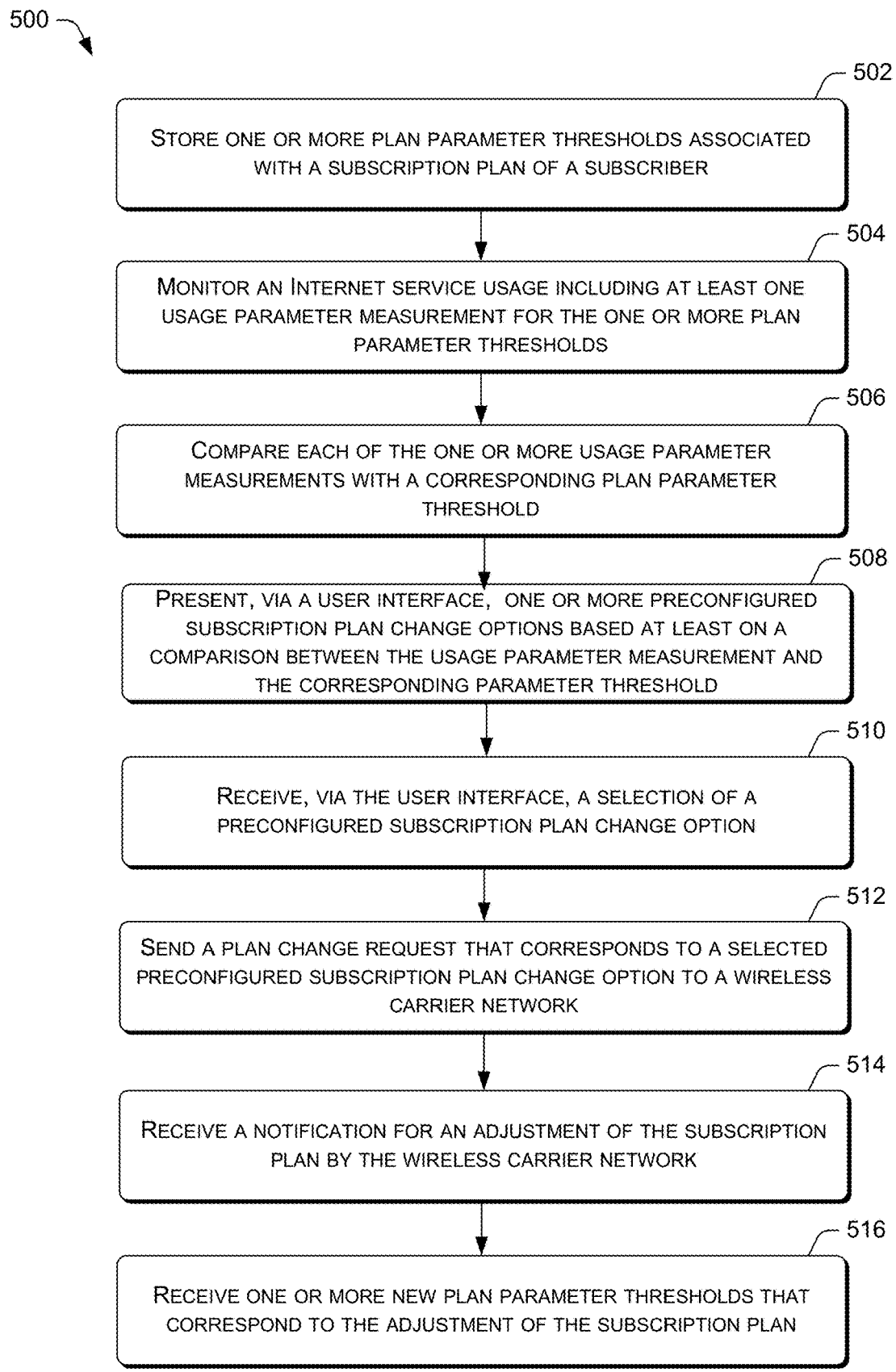
FIG. 5 is a flow diagram of an example process for the cellular modem device to manage the in-home Internet service subscription plans.

FIG. 5 is a flow diagram of an example process 500 for the cellular modem device to manage the subscription plan. At block 502, the cellular modem device 200 may store one or more plan parameter thresholds that are associated with a subscription plan during a current billing period. The plan parameter thresholds may be supplied by the Internet service server and can include a preconfigured limit for each of the usage parameter measurements. In one example, the threshold value module 222 may store the plan parameter thresholds received from the Internet service server. Following an adjustment of the subscription plan, the threshold value module 222 may also receive corresponding new plan parameter thresholds. Alternatively, the cellular modem device 200 need not receive or store the plan parameter thresholds when the Internet service server is doing the comparison between the obtained usage parameter measurements and the corresponding plan parameter thresholds. In these alternative embodiments, the customer management platform 310 may store the plan parameter thresholds in the database 320.

At block 504, the cellular modem device 200 may monitor an Internet service usage including at least one usage parameter measurement for the one or more plan parameter thresholds during a current billing period. Alternatively, the cellular modem device 200 may transmit the obtained at least one usage parameter measurement to the Internet service provider for storage and/or further processing by the customer management platform 310.

At block 506, the cellular modem device 200 may compare a usage parameter measurement with a corresponding plan parameter threshold of the subscription plan. In one example, the subscription management application 220 may retrieve the obtained usage parameter measurements from the data storage 230 and compare each of the obtained usage measurements with the corresponding plan parameter threshold. In an alternative case where the Internet service server is managing the subscription plan, the customer management platform 310 may retrieve the usage parameter measurements from the database 320 and compare each of the obtained usage measurements with the corresponding plan parameter threshold. The usage parameter measurements in the database 320 may be received from the cellular modem device 200.

At block 508, the cellular modem device 200 may present one or more preconfigured subscription plan change options via a user interface of the cellular modem device based at least on a comparison between the usage parameter measurement and the corresponding plan parameter threshold. In one example, the cellular modem device 200 may receive and store the subscription plan change options from the Internet service server. In an alternative case where the Internet service server is managing the subscription plan, the customer management platform 310 may send the one or more preconfigured subscription plan change options including an instruction to the cellular modem device to present the subscription plan change options to the subscriber. The subscription plan change options to be presented may be based upon the comparison that can be performed by the Internet service server on the received at least one usage parameter measurement and the corresponding plan parameter threshold.

At block 510, the cellular modem device 200 may receive a selection of a preconfigured subscription plan change option via the user interface of the cellular modem device. Alternatively, the cellular modem device 200 may send the selection to the Internet service server for further processing. Particularly, in an alternative case where the Internet service server is managing the subscription plan, the customer management platform 310 may use the selection to adjust the corresponding feature in the subscription plan of the subscriber.

At block 512, the cellular modem device 200 may send a subscription plan change request that corresponds to a selected subscription plan change option to the wireless carrier network to adjust the subscription plan of the subscriber. In one example, the subscription plan change request may include the device identification of the sending cellular modem device, the feature to be adjusted, and/or the like. In an alternative case where the Internet service server is managing the subscription plan, the customer management platform 310 may receive and use the subscription plan change request to adjust the subscription plan of the subscriber.

At block 514, the cellular modem device 200 may receive a notification for an adjustment of the subscription plan by the wireless carrier network. In response to receiving of the subscription plan change request from the cellular modem device 200, the Internet service server may adjust the subscription plan and send the notification to the cellular modem device 200. In a case where the Internet service server is managing the subscription plan, the customer management platform 310 may send the notification and a corresponding instruction for the cellular modem device to display the notification to the subscriber.

At block 516, the cellular modem device 200 may receive one or more new plan parameter thresholds that correspond to the adjustments in the subscription plan from the Internet service server. In one example, the plan parameter thresholds for the adjusted subscription plan may be updated with the new one or more plan parameter thresholds. In an alternative case where the Internet service server is managing the subscription plan, the customer management platform 310 may store the new plan parameter thresholds in the database 320.

Figure 6:
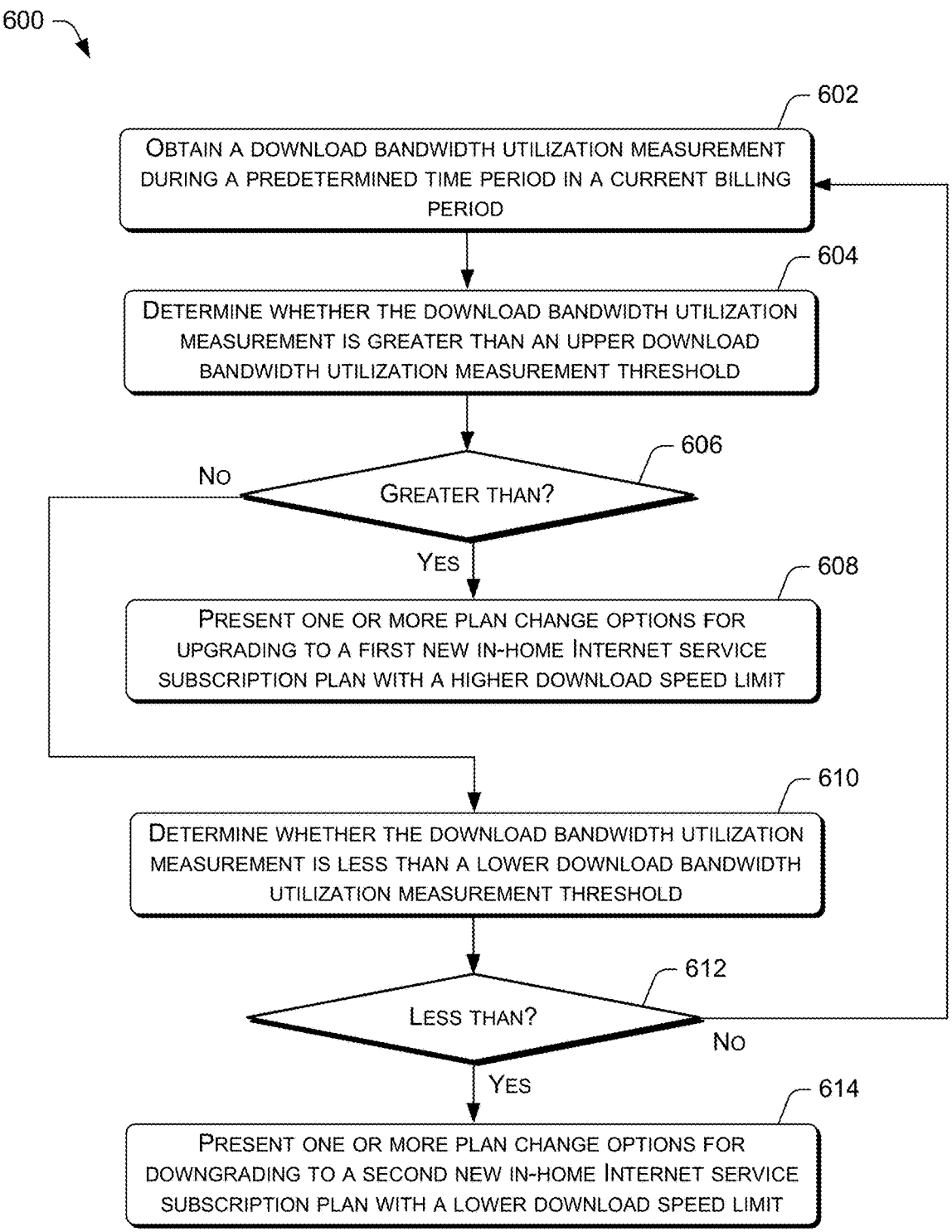
FIG. 6 is a flow diagram of an example process for the cellular modem device to facilitate adjustments in a download speed limit of the in-home Internet service subscription plans.

FIG. 6 is a flow diagram of an example process 600 for adjusting the download speed limit of the subscription plan based upon a comparison between the download bandwidth utilization measurement and the upper or lower download bandwidth utilization measurement threshold. At block 602, the cellular modem device 200 may obtain a download bandwidth utilization measurement during a predetermined time period in a current billing period. The download bandwidth utilization measurement may include an average download speed that is measured by the cellular modem device 200 within the predetermined time period in the current billing period.

At block 604, the cellular modem device 200 may determine whether the obtained download bandwidth utilization measurement is greater than an upper download bandwidth utilization measurement threshold. At decision block 606, if the obtained download bandwidth utilization measurement is greater than the upper download bandwidth utilization measurement threshold, then the process may proceed to block 608. At block 608, the cellular modem device 200 may present one or more subscription plan change options for upgrading to a first new subscription plan with a higher download speed limit.

Returning to decision block 606, if the obtained download bandwidth utilization measurement is lower than the upper download bandwidth utilization measurement threshold, then the process may proceed to block 610. At block 610, the cellular modem device 200 may determine whether the download bandwidth utilization measurement is less than a lower download bandwidth utilization measurement threshold.

At decision block 612, if the download bandwidth utilization measurement is less than the lower download bandwidth utilization measurement threshold, then the process may proceed to block 614. At block 614, the cellular modem device 200 may present one or more subscription plan change options for downgrading to a second new subscription plan with a lower download speed limit.

Returning to the decision block 612, if the download bandwidth utilization measurement is higher than the lower download bandwidth utilization measurement threshold, then the process may proceed to block 602 where the cellular modem device 200 may obtain another download bandwidth utilization measurement.

Figure 7:
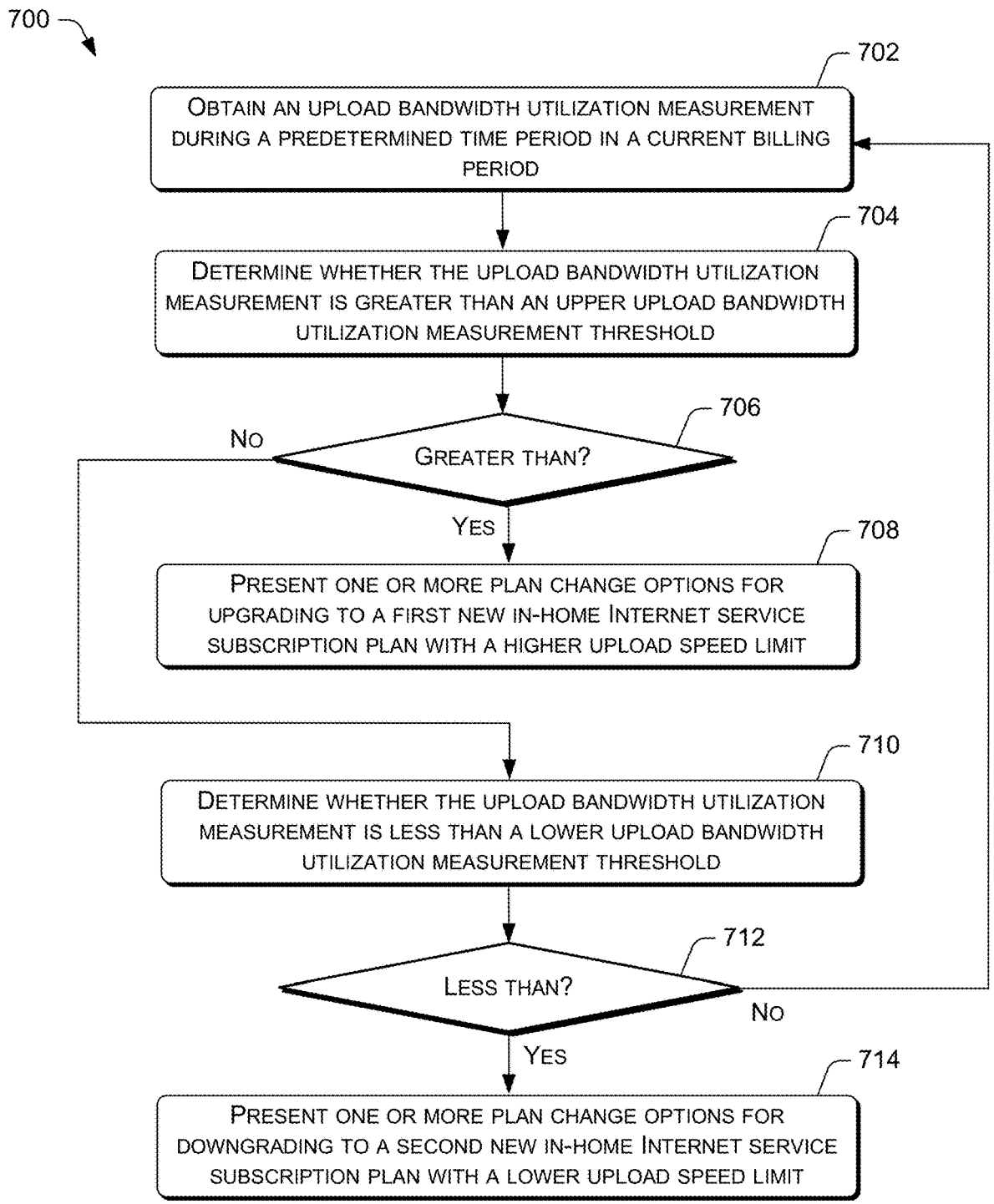
FIG. 7 is a flow diagram of an example process for the cellular modem device to facilitate adjustments in an upload speed limit of the in-home Internet service subscription plans.

FIG. 7 is a is a flow diagram of an example process 700 for adjusting the upload speed limit of the subscription plan based upon a comparison between the upload bandwidth utilization measurement and the upper or lower upload bandwidth utilization measurement threshold. At block 702, the cellular modem device 200 obtains an upload bandwidth utilization measurement during a predetermined time period in a current billing period. At block 704, the cellular modem device 200 determines whether an obtained upload bandwidth utilization measurement is greater than an upper upload bandwidth utilization measurement threshold.

At decision block 706, if the obtained upload bandwidth utilization measurement is greater than the upper upload bandwidth utilization measurement threshold, then the process may proceed to block 708. At block 708, the cellular modem device 200 may present one or more subscription plan change options for upgrading to a first new subscription plan with a higher upload speed limit.

Returning to decision block 706, if the obtained upload bandwidth utilization measurement is lower than the upper upload bandwidth utilization measurement threshold, then the process may proceed to block 710. At block 710, the cellular modem device 200 may determine whether the upload bandwidth utilization measurement is less than a lower upload bandwidth utilization measurement threshold.

At decision block 712, if the upload bandwidth utilization measurement is less than the lower upload bandwidth utilization measurement threshold, then the process may proceed to block 714. At block 714, the cellular modem device 200 may present one or more subscription plan change options for downgrading to a second new subscription plan with a lower upload speed limit.

Returning to the decision block 712, if the upload bandwidth utilization measurement is higher than the lower upload bandwidth utilization measurement threshold, then the process may proceed to block 702 where the cellular modem device 200 may obtain another upload bandwidth utilization measurement.

Figure 8:
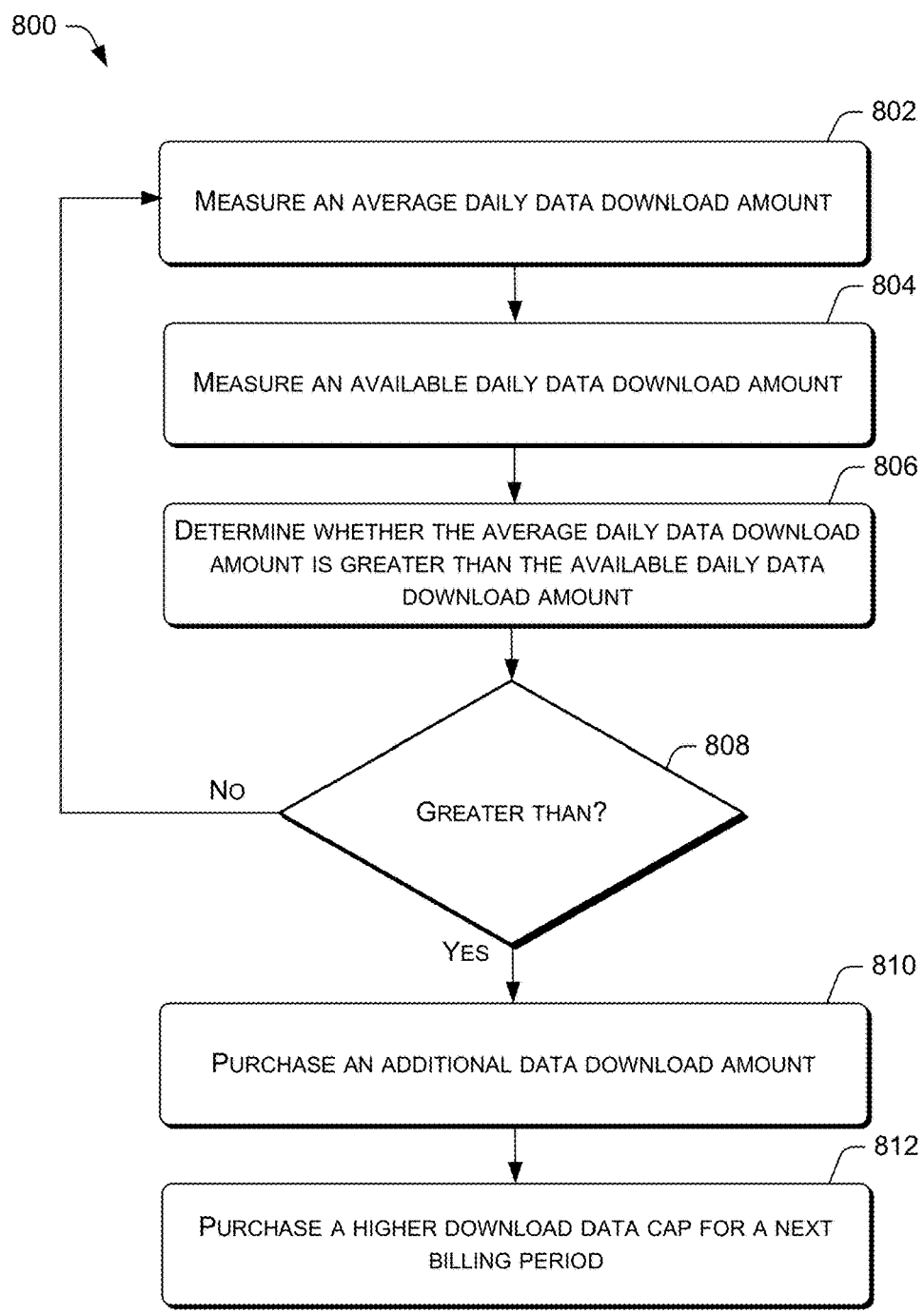
FIG. 8 is a flow diagram of an example process for the cellular modem device to purchase an additional data download amount for the in-home Internet service subscription plans.

FIG. 8 is a flow diagram of an example process 800 for purchasing an additional data download amount based upon a comparison between an average daily data download amount and an available daily data download amount during a current billing period. At block 802, the cellular modem device 200 may measure an average daily data download amount during a current billing period. In one example, the average daily data download amount is the current total amount of data downloaded during the current billing period divided by the number of days elapsed in the current billing period.

At block 804, the cellular modem device 200 may measure an available daily data download amount during the current billing period. For example, the available daily data download amount is the download data cap for the current billing period divided by a total number of days in the current billing period.

At block 806, the cellular modem device 200 may determine whether the average daily data download amount is greater than the available daily data download amount during the current billing period.

At decision block 808, if the average daily data download amount is greater than the available daily data download amount during the current billing period, then the process proceeds to block 810. At block 810, the cellular modem device 200 may purchase an additional data download amount for the current billing period. Further, at block 812, the cellular modem device 200 may purchase a higher download data cap for the next billing period.

Returning to the decision block 808, if the average daily data download amount is less than the available daily data download amount during the current billing period, then the process proceeds to block 802.

Figure 9:
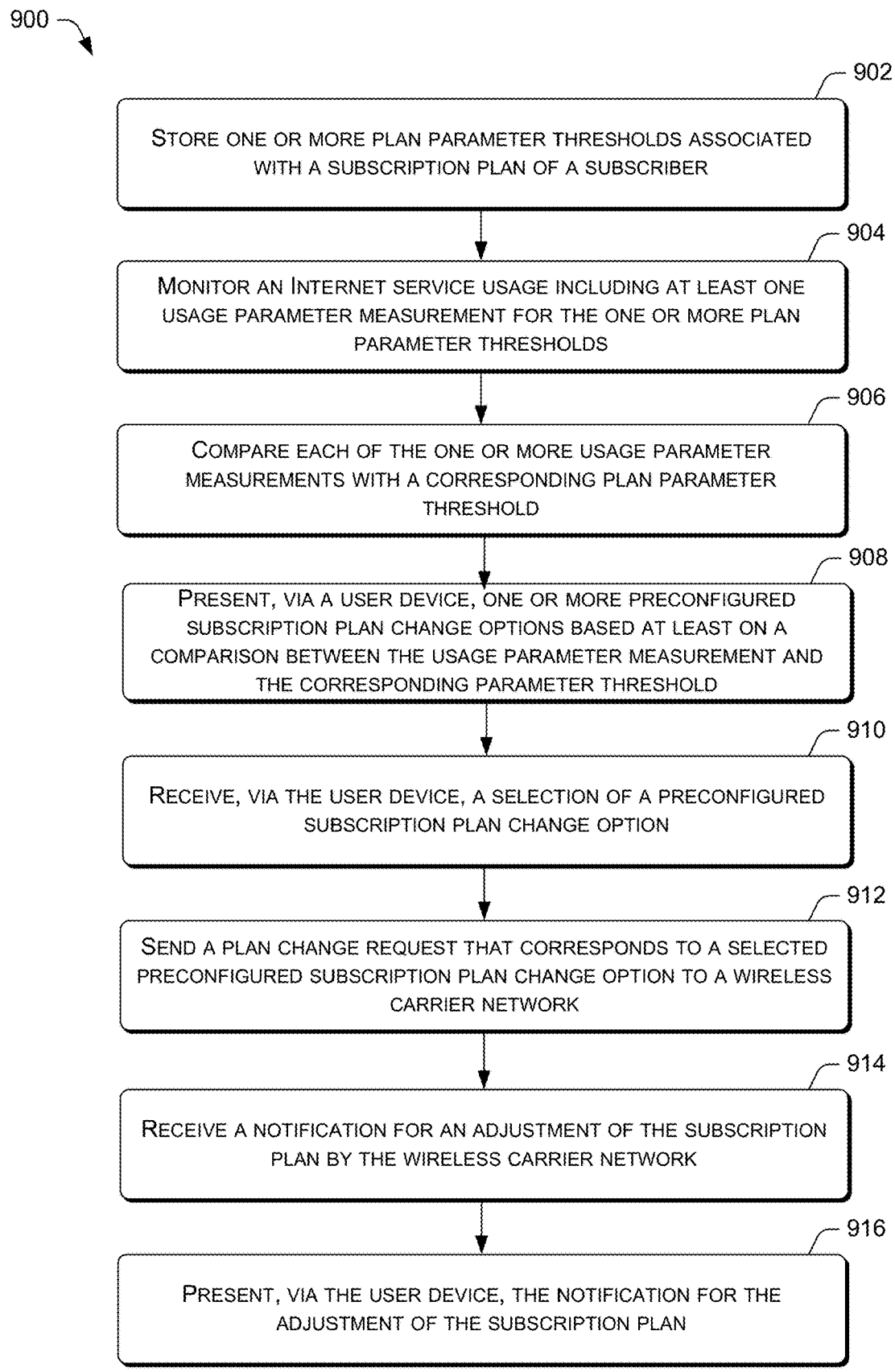
FIG. 9 is a flow diagram of an example process for the cellular modem device to manage the in-home Internet service subscription plans.

FIG. 9 is a flow diagram of an example process 900 for the cellular modem device to manage the subscription plan. At block 902, the cellular modem device 200 may store one or more plan parameter thresholds that are associated with a subscription plan during a current billing period. In an alternative case where the Internet service server is doing the overall process of managing the subscription plan, the cellular modem device 200 need not receive and/or store the plan parameter thresholds from the Internet service server. In these alternative embodiments, the customer management platform 310 may store the plan parameter thresholds in the database 320.

At block 904, the cellular modem device 200 may monitor an Internet service usage including at least one usage parameter measurement for the one or more plan parameter thresholds during the current billing period. Alternatively, the cellular modem device 200 may transmit the obtained at least one usage parameter measurement to the Internet service provider for storage and/or further processing by the customer management platform 310.

At block 906, the cellular modem device 200 may compare a usage parameter measurement with a corresponding plan parameter threshold of the subscription plan. In an alternative case where the Internet service server is doing the overall process of managing the subscription plan, the customer management platform 310 may retrieve the usage parameter measurements from the database 320 and compare each of the obtained usage measurements with the corresponding plan parameter threshold. The usage parameter measurements in the database 320 may be received from the cellular modem device 200.

At block 908, the cellular modem device 200 may present, via a user device, one or more preconfigured subscription plan change options based at least on a comparison between the usage parameter measurement and the corresponding plan parameter threshold. In one example, the cellular modem device 102 may be communicatively connected with the user device, such as the smart television 110, smart speaker 112, and/or smartphone 114. In this example, the subscription plan change options may be displayed via the smart television 110, smart speaker 112, and/or smartphone 114. In an alternative case where the Internet service server is managing the subscription plan, the customer management platform 310 may send the one or more preconfigured subscription plan change options including an instruction to the cellular modem device to present the subscription plan change options via the connected user device. The subscription plan change options to be presented may be based upon the comparison performed by the Internet service server between the received at least one usage parameter measurement and the corresponding plan parameter threshold.

At block 910, the cellular modem device 200 may receive, via the user device, a selection of a preconfigured subscription plan change option. Alternatively, the Internet service server may request the cellular modem device 200 to utilize the user device for receiving of the selection from the subscriber. The Internet service server may also request the cellular modem device 200 to communicate the selection. In one example, the Internet service server may use the selection to adjust the corresponding feature in the subscription plan of the subscriber.

At block 912, the cellular modem device 200 may send a subscription plan change request that corresponds to a selected subscription plan change option to the wireless carrier network to adjust the subscription plan. In an alternative case where the Internet service server is managing the subscription plan, the customer management platform 310 may receive and use the subscription plan change request to adjust the subscription plan of the subscriber.

At block 914, the cellular modem device 200 may receive a notification for an adjustment of the subscription plan of the subscriber to a new subscription plan by the wireless carrier network. In response to receiving of the subscription plan change request from the cellular modem device 200, the Internet service server may adjust the subscription plan and send the notification to the cellular modem device 200. In a case where the Internet service server is managing the subscription plan, the customer management platform 310 may send the notification and a corresponding instruction for the cellular modem device to display the notification, via the connected user device, to the subscriber.

At block 916, the cellular modem device 200 may present, via the user device, the notification for the adjustment of the subscription plan of the subscriber. Alternatively, the Internet service server may send an instruction for the cellular modem device to display the notification, via the connected user device, to the subscriber.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
storing, at a cellular modem device, one or more plan parameter thresholds associated with an in-home Internet service subscription plan of a subscriber during a current billing period, the in-home Internet service subscription plan is for using Internet service from a wireless carrier network via the cellular modem device;
monitoring, at the cellular modem device, an Internet service usage during the current billing period that includes at least one usage parameter measurement for the one or more plan parameter thresholds;
comparing a usage parameter measurement with a corresponding plan parameter threshold of the in-home Internet service subscription plan;
presenting one or more preconfigured subscription plan change options via a user interface of the cellular modem device based at least on a comparison between the usage parameter measurement and the corresponding plan parameter threshold,
wherein the presenting includes presenting one or more subscription plan change options for downgrading to a new in-home Internet service subscription plan with a lower download speed limit when a comparison indicates that a download bandwidth utilization measurement during a predetermined time period is lower than a lower download bandwidth utilization measurement threshold;
receiving a selection of a preconfigured subscription plan change option through the user interface of the cellular modem device; and
sending, from the cellular modem device, a subscription plan change request that corresponds to a selected subscription plan change option to the wireless carrier network to adjust the in-home Internet service subscription plan of the subscriber.

2. The computer-implemented method of claim 1, wherein the one or more plan parameter thresholds include at least one of an upper download bandwidth utilization measurement threshold, the lower download bandwidth utilization measurement threshold, or a data download data cap for the current billing period.

3. The computer-implemented method of claim 2, wherein the at least one usage parameter measurement include at least one of the download bandwidth utilization measurement during the predetermined time period, or a current total amount of data downloaded during the current billing period.

4. The computer-implemented method of claim 3, wherein the presenting includes presenting one or more subscription plan change options for upgrading to a new in-home Internet service subscription plan with a higher download speed limit when the comparison indicates that the download bandwidth utilization measurement during the predetermined time period exceeded the upper download bandwidth utilization measurement threshold.

5. The computer-implemented method of claim 3, wherein the presenting includes presenting one or more subscription plan change options to purchase an additional data download amount when the comparison indicates that an average daily data download amount exceeds an available daily data download amount during the current billing period, wherein the average daily data download amount is the current total amount of data downloaded during the current billing period divided by a number of days elapsed in the current billing period, and the available daily data download amount is the download data cap for the current billing period divided by a total number of days in the current billing period.

6. The computer-implemented method of claim 5, wherein the presenting includes presenting a subscription plan change option to purchase a new In-home Internet service subscription plan that includes a higher download data cap for a next billing period when the comparison indicates that the average daily data download amount exceeds the available daily data download amount during the current billing period.

7. The computer-implemented method of claim 1, further comprising:
receiving, in response to the subscription plan change request, a notification for an adjustment of the in-home Internet service subscription plan of the subscriber to the new in-home Internet service subscription plan by the wireless carrier network at the cellular modem device; and
presenting, via the user interface of the cellular modem device, the notification for the adjustment of the in-home Internet service subscription plan of the subscriber.

8. The computer-implemented method of claim 7, wherein the receiving the notification for the adjustment includes receiving, at the cellular modem device, one or more new plan parameter thresholds of the new in-home Internet subscription plan that corresponds to the selected subscription plan change option, further comprising:
comparing, at the cellular modem device, each of the one or more usage parameter measurements with a corresponding new plan parameter threshold of the new in-home Internet service subscription plan; and
presenting, via the user interface of cellular modem device, one or more additional preconfigured subscription plan change options via the user interface of the cellular modem device based at least on an additional comparison between the usage parameter measurement and the corresponding new plan parameter threshold.

9. The computer-implemented method of claim 7, wherein the selected subscription plan change option corresponds to selecting a use of the new in-home Internet subscription plan for a particular time duration, further comprising:
receiving a notification of a reversion back to the in-home Internet service subscription plan from the wireless carrier network following a lapse of the particular time duration; and
presenting, via the user interface of the cellular modem device, the notification of the reversion back to the in-home Internet service subscription plan.

10. The computer-implemented method of claim 1, further comprising: preconfiguring different subscription plan change options based on different tiers of download bandwidth utilization measurement thresholds.

11. The computer-implemented method of claim 10, wherein the different tiers include two levels of upper download bandwidth utilization measurement thresholds.

12. A system, comprising:
one or more processors; and memory including a plurality of computer-executable components that are executable by the one or more processors to perform a plurality of actions, the plurality of actions comprising:

storing one or more plan parameter thresholds associated with an in-home Internet service subscription plan of a subscriber during a current billing period, the in-home Internet service subscription plan is for using Internet service from a wireless carrier network via a cellular modem device;

monitoring an Internet service usage during the current billing period by receiving at least one usage parameter measurement for the one or more plan parameter thresholds;

comparing each of the at least one usage parameter measurement with a corresponding plan parameter threshold of the in-home Internet service subscription plan;

providing one or more preconfigured subscription plan change options to the cellular modem device for presentation via the cellular modem device or a user device that is communicatively connected to the cellular modem device based at least on a comparison between each of the at least one usage parameter measurement and the corresponding plan parameter threshold, wherein the providing includes presenting one or more subscription plan change options for downgrading to a new in-home Internet service subscription plan with a lower download speed limit when a comparison indicates that a download bandwidth utilization measurement during a predetermined time period is lower than a lower download bandwidth utilization measurement threshold;

receiving a selection of a preconfigured subscription plan change option that is inputted via the cellular modem device or the user device; and adjusting the in-home Internet service subscription plan of the subscriber based on the preconfigured subscription plan change option.

13. The system of claim 12, wherein the providing includes providing the one or more preconfigured subscription plan change options for upgrading to a new in-home Internet service subscription plan with a higher download speed limit when the comparison indicates that download bandwidth utilization measurement during the predetermined time period exceeded an upper download bandwidth utilization measurement threshold.

14. The system of claim 12, wherein the providing includes providing one or more subscription plan change options to purchase an additional data download amount when the comparison indicates that an average daily data download amount exceeds an available daily data download amount during the current billing period, wherein the average daily data download amount is a current total amount of data downloaded during the current billing period divided by a number of days elapsed in the current billing period, and the available daily data download amount is a download data cap for the current billing period divided by a total number of days in the current billing period.

15. The system of claim 14, wherein the providing includes the presenting a subscription plan change option to purchase a new In-home Internet service subscription plan that includes a higher download data cap for a next billing period when the comparison indicates that the average daily data download amount exceeds the available daily data download amount during the current billing period.

16. The system of claim 12, wherein the plurality of actions further comprise: preconfiguring different subscription plan change options based on different tiers of download bandwidth utilization measurement thresholds.

17. The system of claim 16, wherein the different tiers include two levels of upper download bandwidth utilization measurement thresholds.

18. One or more non-transitory computer-readable media of a cellular modem device storing computer-executable instructions that upon execution cause the cellular modem device to perform acts comprising:

storing one or more plan parameter thresholds associated with an in-home Internet service subscription plan of a subscriber during a current billing period, the in-home Internet service subscription plan is for using Internet service from a wireless carrier network via the cellular modem device;

monitoring an Internet service usage during the current billing period that includes at least one usage parameter measurement for the one or more plan parameter thresholds;

comparing a usage parameter measurement with a corresponding plan parameter threshold of the in-home Internet service subscription plan;

presenting, via a user device that is communicatively connected to the cellular modem device, one or more preconfigured subscription plan change options based at least on a comparison between the usage parameter measurement and the corresponding plan parameter threshold, wherein the presenting includes presenting one or more subscription plan change options for downgrading to a new in-home Internet service subscription plan with a lower download speed limit when a comparison indicates that a download bandwidth utilization measurement during a predetermined time period is lower than a lower download bandwidth utilization measurement threshold;

receiving, via the user device, a selection of a preconfigured subscription plan change option;

sending, from the cellular modem device, a subscription plan change request that corresponds to a selected subscription plan change option to the wireless carrier network to adjust the in-home Internet service subscription plan of the subscriber;

receiving a notification for an adjustment of the in-home Internet service subscription plan of the subscriber by the wireless carrier network at the cellular modem device; and presenting, via the user device, the notification for the adjustment of the in-home Internet service subscription plan of the subscriber.

19. The one or more non-transitory computer-readable media of claim 18, wherein the user device is a smart speaker, a smart television, or a smartphone.

* * * * *